United States Patent [19]
Brües

[11] Patent Number: 5,510,825
[45] Date of Patent: Apr. 23, 1996

[54] METHOD OF CONTROLLING A RECORDING DEVICE WITH PICTURE DATA OF A HALFTONE PICTURE

[75] Inventor: Stefan Brües, Wilhelmsplatz 1, 4430 Steinfurt, Germany

[73] Assignee: Stefan Brües, Steinfurt, Germany

[21] Appl. No.: 82,259

[22] Filed: Jun. 24, 1993

[30] Foreign Application Priority Data

Jul. 23, 1992 [DE] Germany ............................ 42 24 352.1

[51] Int. Cl.⁶ .................................................. H04N 1/21
[52] U.S. Cl. ............................................ 347/251; 358/298
[58] Field of Search ........................ 346/1.1, 108, 107 R, 346/762, 160; 358/298, 296, 300, 302; 347/251, 240, 131

[56] References Cited

U.S. PATENT DOCUMENTS 4,974,920  12/1990  Chovan et al. .................... 350/3.61
5,038,104   8/1991  Wikswo, Jr. et al. ................ 324/258

*Primary Examiner*—Mark J. Reinhart
*Attorney, Agent, or Firm*—Learman & McCulloch

[57] ABSTRACT

The invention relates to a method of controlling a recording device with picture data of a halftone picture, in which the halftone picture is converted into a three-dimensional input data field, then a surface function which reproduces the surface structure of this input data filed is determined and finally from this surface function a three-dimensional output data field is derived, the resolution of which into individual picture elements corresponds to the resolution of the recording device. Such a method permits optimum control of a recording device even when the scanning device used for scanning the halftone picture and the recording device have a differing picture resolution.

10 Claims, 4 Drawing Sheets

METHOD OF CONTROLLING A RECORDING DEVICE WITH PICTURE DATA OF A HALFTONE PICTURE

The invention relates to a method of controlling a recording device with picture data of a halftone picture, in which a scanning device used for scanning the halftone picture and the recording device can have a different picture resolution.

Since the page description language POSTSCRIPT was introduced onto the market some years ago, all text and graphic components of a page can be neutrally coded and thus can be output independently of the equipment.

However, this does not apply at present to halftone pictures. Halftone pictures in analogue form must be scanned dot by dot by a scanning device, the resolution of the scanning device being chosen as a function of the target resolution, i.e. the resolution of the recording device to be controlled. This method proves inconvenient when the scanning device has only one single resolution or a limited resolution available which cannot be adapted to the resolution of the recording device. Further disadvantages are encountered when a scanning device with adjustable resolution is to be used for the operation of various recording devices (with differing resolution), but during scanning of the halftone picture it has not yet been established which recording device is to be used.

The object of the invention, therefore, is to provide a method of the aforementioned type so that the control of a recording device with picture data of a halftone picture is also ideally possible when the scanning device used for scanning the halftone picture and the recording device have a differing picture resolution.

This object is achieved according to the invention by the following method steps:

a) the halftone picture is first of all converted into a three-dimensional input data field (co-ordinate axes x, y, z) in at least one zone, in which case the space co-ordinates of the individual picture elements of the halftone picture are plotted on the x and y axis and the appertaining brightness values on the z axis;

b) then a surface function which approximately reproduces the surface structure of this three-dimensional input data field is determined;

c) finally, a three-dimensional output data field to be delivered to the recording device is derived from this surface function, the resolution of the said output data field into individual picture elements corresponding to the resolution of the recording device.

Thus in the method according to the invention the halftone picture is first of all converted into an input data field which has the resolution of the scanning device used for scanning the halftone picture. Then in a second method step this input data field is converted into a coded form not related to a specific device. In a third method step an output data field corresponding to the resolution of the recording device is derived from this coded form which is not related to a specific device.

Thus with the method according to the invention a recording device with any picture resolution can be controlled irrespective of the resolution of the scanning device used in the scanning of the halftone picture.

Advantageous embodiments of the invention are the subject matter of the subordinate claims. The invention will be further explained with the aid of one embodiment.

DETAILED DESCRIPTION OF PREFERRED EMBODIMENTS

Figure 1:
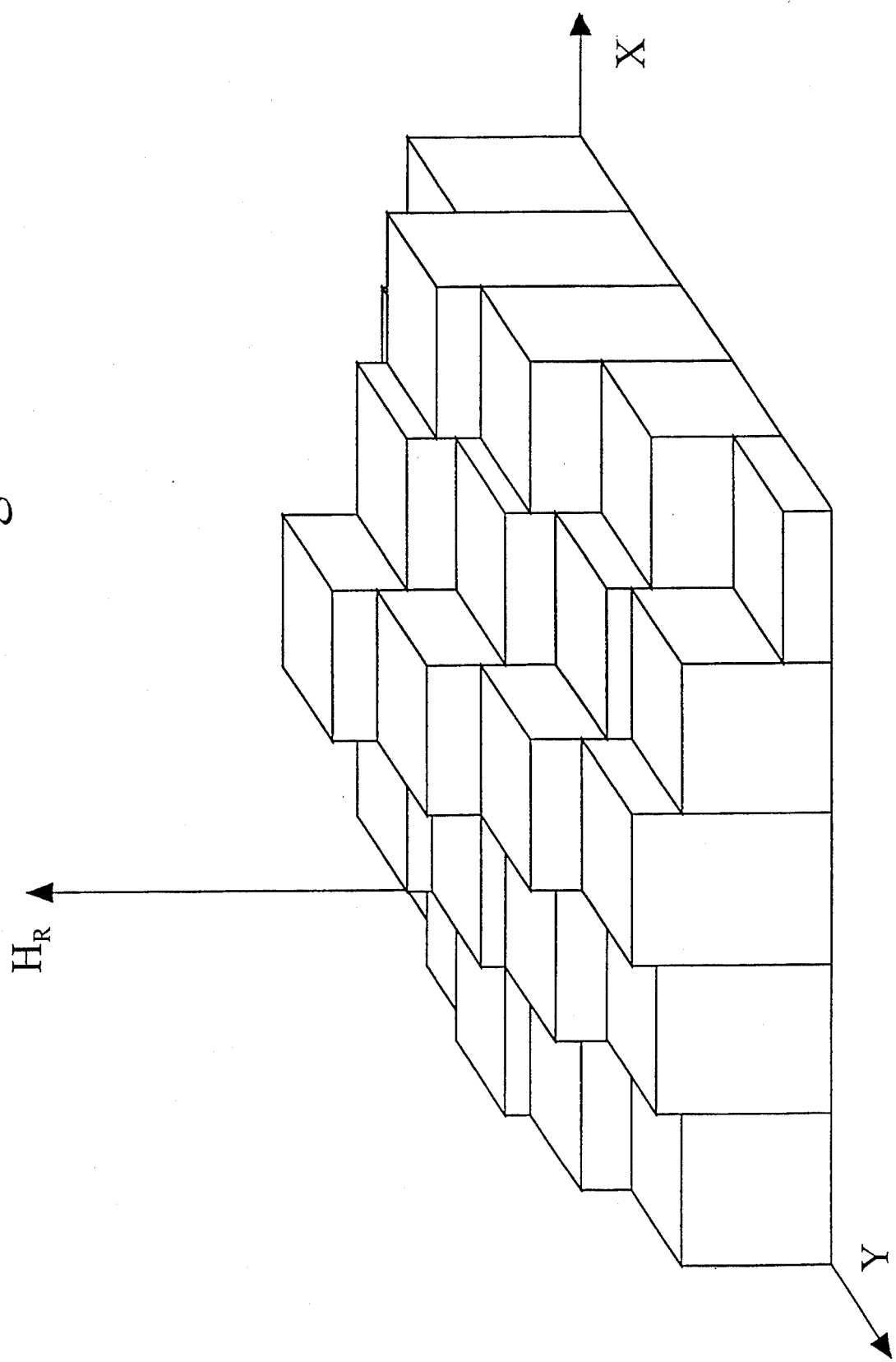
FIGS. 1 to 4 of the drawings show in quite schematic form the three method steps of the method according to the invention.

The halftone picture (which is not shown in the drawings) is first of all converted zone by zone into a three-dimensional input data field (with the co-ordinate axes x, y and z), with the space co-ordinates of the individual picture elements of the halftone picture being plotted on the x and y axes and the appertaining brightness value $H_R$ on the z axis. During the scanning operation a relative brightness value $H_R$ is determined for each picture element (pixel), this brightness value being dependent upon the maximum storage depth provided in the scanning device (e.g. 8 bits of storage depth per pixel corresponds to a storage depth of 256 brightness stages).

On the other hand, it is only possible to make a reliable statement about the absolute brightness value of the pixel when the scanning device has been calibrated to a reference white and reference black and the tone value transmission characteristic related to a specific device is known. In some cases the sensors used in the scanning device are not capable of detecting the entire range of brightness which is relevant for printing applications. The scope and lower boundary value of the dynamic range for the scanning device used can be determined in an adjusting and calibration operation.

The representation in FIG. 1 of a zone of the halftone picture can be designated as a brightness pattern and is dependent upon the resolution of the scanning device used for scanning of the halftone picture.

In a second method step this three-dimensional input data field, i.e. the brightness pattern of the halftone picture, is converted into a form which is not related to a specific resolution. For this purpose a surface function which approximately reproduces the surface structure of this three-dimensional input data field is determined. It is adapted to the brightness pattern so that all brightness values of the individual picture elements (pixels) lie on the surface described by the function. In certain applications it may be permissible to place the surface function in a defined tolerance above or below the brightness pattern.

Figure 2:
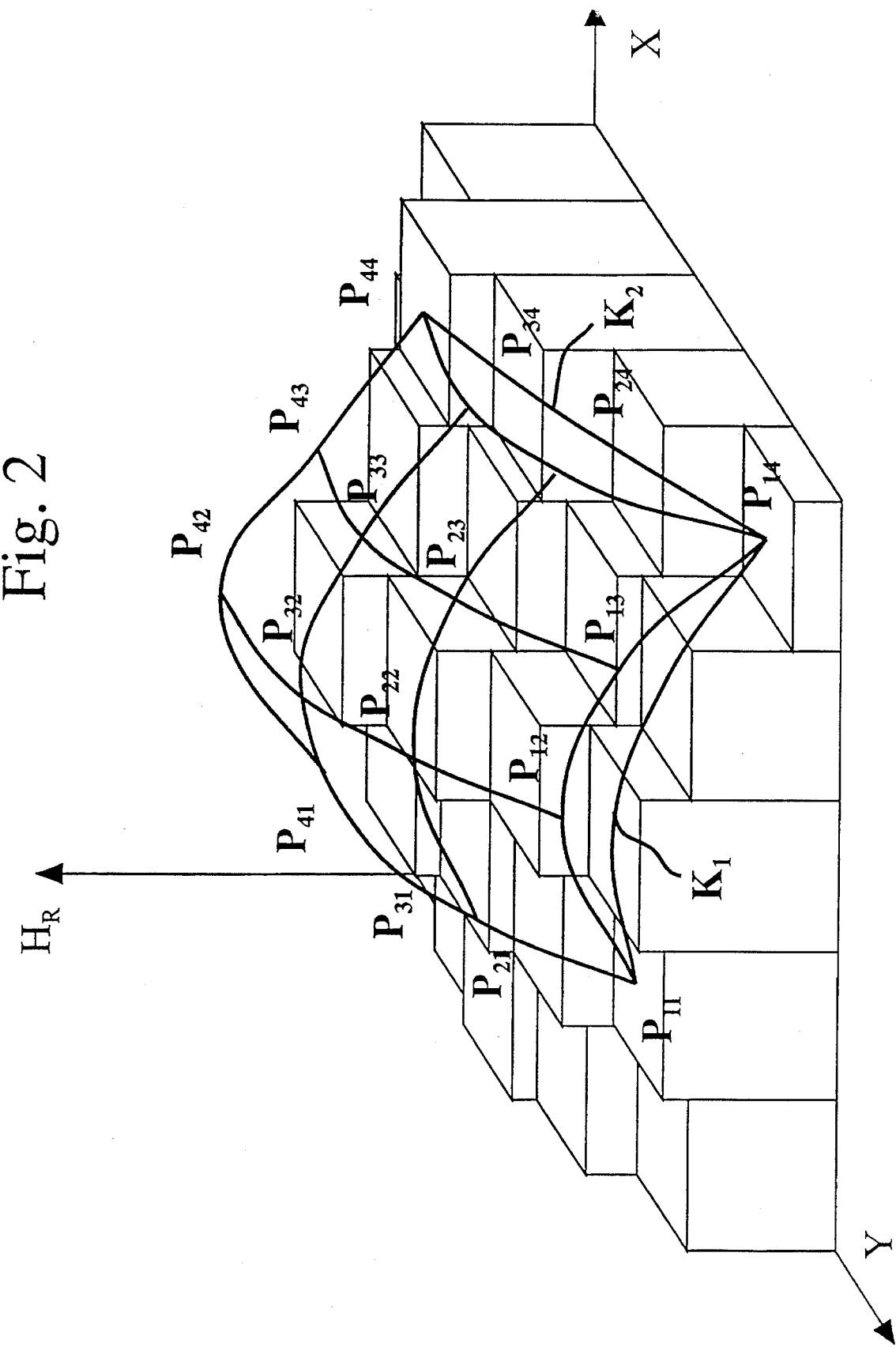

A suitable cubic surface function is for example a Bézier function, the position of which in the co-ordinate system is determined by 1.6 support points (P11 to P14, P21 to P24, P31 to P34 and P41 to P44). The surface defined by this surface function and running through the peak values of the brightness pattern is characterised schematically in Figure 2 by the contours K1 and K2 (to aid understanding it may be pointed out that the support points of a Bézier function lie partially outside the surface defined by this function).

The determination of such a surface function is described for example in Foley, J. and van Dam, A.: Fundamentals of Interactive Computer Graphics, Addison Wesley, 1982, pages 51.9 ff).

Figure 3:
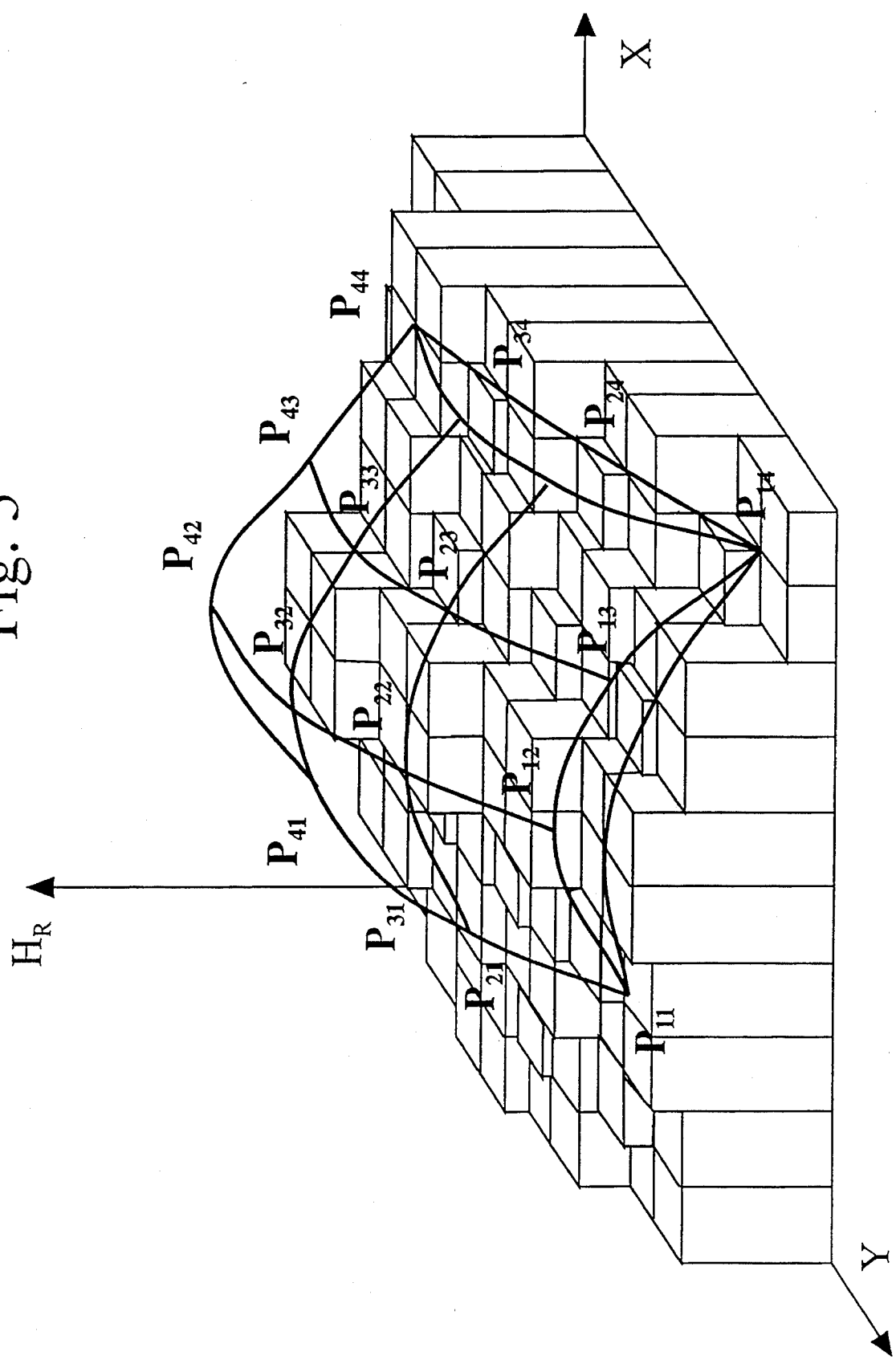

In a third method step a three-dimensional output data field to be delivered to the recording device is derived from this determined surface function, the resolution of the said three-dimensional output field into individual picture elements corresponding to the resolution of the recording device. This method step is illustrated in FIG. 3. A three-dimensional output data field (brightness pattern), the resolution of which deviates from that of the input data field (FIG. 2), can be seen here below the surface function (with its support points P11 to P44).

If a recording device is to be controlled with picture data of a multi-colour halftone picture then the method according to the invention is carried out as follows:

first of all in at least two, preferably at least three separate scanning operations using a corresponding number of colour filters the halftone picture is converted into several three-dimensional input data fields;

then surface functions which approximately reproduce the surface structures of these three-dimensional input data fields are determined;

finally, several three-dimensional output data fields to be delivered to the recording device are derived from these surface functions.

If the halftone picture is presented in analogue form, then it is first of all digitised before then being converted to the three-dimensional input data field.

On the other hand, if the halftone picture is already in digital form it can be converted directly into the three-dimensional input data field.

As already mentioned above, the halftone picture is converted zone by zone into individual three-dimensional input data fields, and a surface function which approximately reproduces the surface structure of the relevant input data field is then determined for each input data field. In this case the surface functions which correspond to the individual zones of the halftone picture adjoin one another without gaps.

In high-resolution halftone pictures brightness values in most regions of a picture do not deviate significantly from one another and frequently are converted almost continuously into other brightness values. Basically, therefore, it is not necessary for the support points of the adjacent (connected) Bézier surface functions to be identical to the co-ordinates of the individual picture elements (pixel coordinates). In fact by skilful arrangement of the support points large picture areas can be described by one single surface function and in this way—depending upon the picture content in each case—high data compression rates can be achieved.

Thus according to the invention the size of the zone of the halftone picture detected in each case by a surface function and thus the reciprocal spacing of the support points of this surface function can be chosen as a function of the brightness fluctuations contained in the halftone picture in such a way that in picture areas with strong brightness fluctuations the zone size is smaller than in picture areas with low brightness fluctuations.

Figure 4:
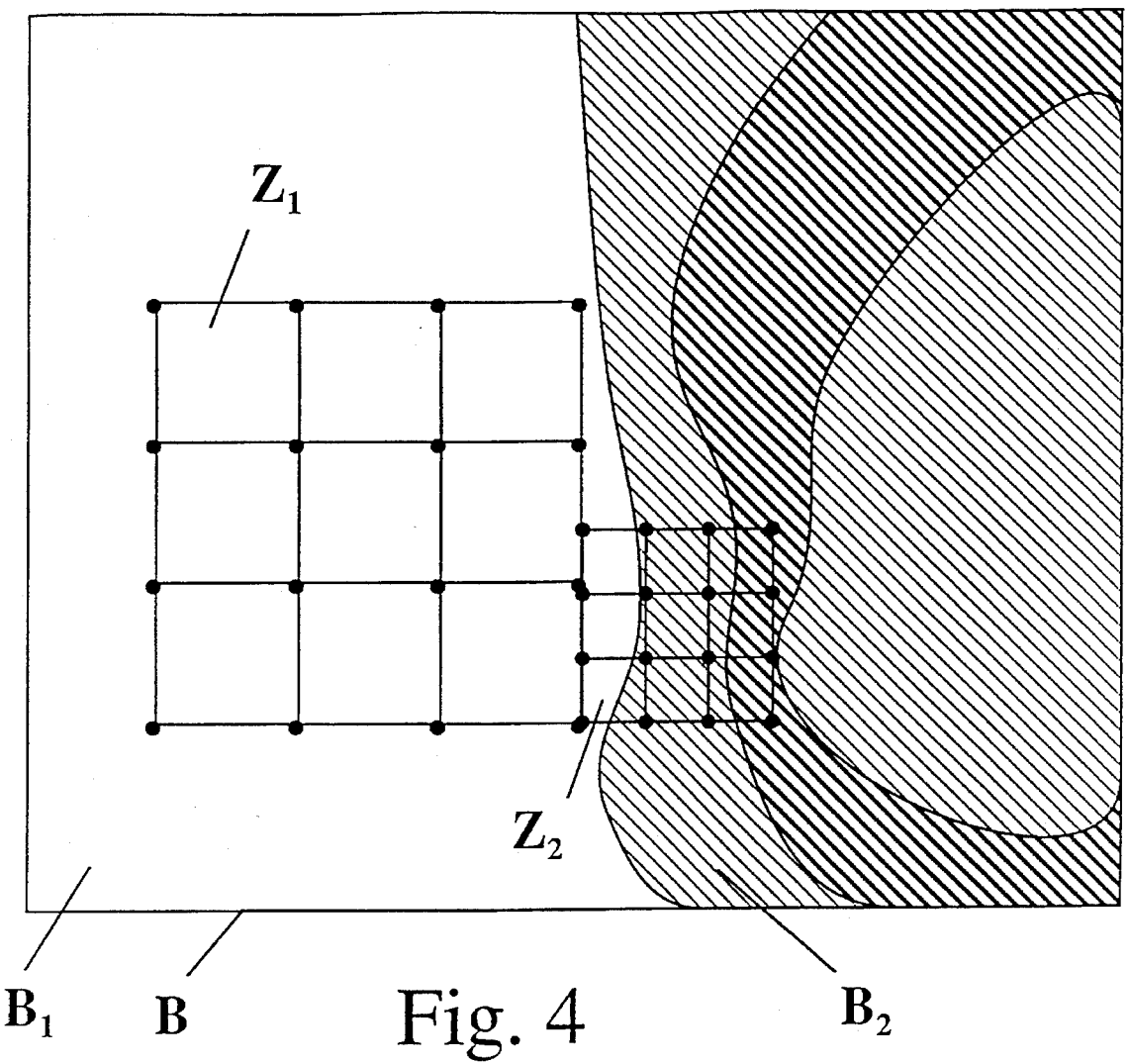

FIG. 4 illustrates this relationship in quite schematic form.

The halftone picture B contains a picture area $B_1$ with low brightness fluctuations and a picture area $B_2$ with high brightness fluctuations. For the consideration of this differing brightness structure, in the picture area $B_1$ the the zones $Z_1$ which are each detected by a surface function are substantially larger than the corresponding zones $Z_2$ in the picture area $B_2$.

In this case a surface function which approximately reproduces the surface structure of the three-dimensional input data field is determined for each of the zones $Z_1$, $Z_2$, and an output data field corresponding to the resolution of the recording device is derived from this surface function.

Instead of the Bézier surface function mentioned above, a Hermits surface function can also be used for example in the method according to the invention. This is equally described by the position of 16 support points in the coordinate system.

However, in contrast to the Bézier surface function all the support points lie on the surface to be described in a Hermite surface function. For details reference is made to the literature already mentioned above.

I claim:

1. A method of producing an output data field for a recording device from picture data that represent a halftone picture, in which a scanning device used for scanning the halftone picture and the recording device can have a different picture resolution, characterized by the following method steps:

(a) converting at least a portion of the halftone picture into an input data field that represents the halftone picture in three-dimensional space, with two dimensions representing the relative locations of the picture data within the halftone picture and the third dimension representing the brightness of the picture data at those locations;

(b) determining a surface function which approximates the surface structure of the input data field in the three-dimensional space; and (c) using the surface function to generate the output data field with a resolution corresponding to the resolution of the recording device.

2. The method as claimed in claim 1, wherein:

step (a) further comprises generating a plurality of input data fields by scanning a multi-color halftone picture a plurality of times using a different color filter during each scan;

step (b) further comprises determining a surface function for each of the plurality of input data fields; and step (c) further comprises using the surface functions to generate a plurality of output data fields.

3. The method as claimed in claim 1, wherein step (a) further comprises scanning the halftone picture to generate an analog representation of the halftone picture and digitizing the analog representation.

4. The method as claimed in claim 1, wherein step (a) further comprises converting a digital halftone picture into the input data field.

5. The method as claimed in claim 1, wherein step (b) further comprises using the input data field to determine a Bézier surface function having a position referenced to the three-dimensional space by an array of support points.

6. The method as claimed in claim 1, wherein step (b) further comprises using the input data field to determine a Hermite surface function having a position referenced to the three-dimensional space by an array of support points.

7. The method as claimed in claim 1, further comprising the step of dividing the halftone picture into a plurality of contiguous sections, and wherein:

step (b) further comprises determining a separate surface function for each of the contiguous sections; and step (c) further comprises using the surface functions to determine at least one output data field with a resolution corresponding to the resolution of the recording device.

8. The method as claimed in claim 7, wherein said dividing step further comprises selecting the size of each contiguous section in accordance with the fluctuations in brightness of the halftone picture within that section.

9. The method as claimed in claim 8, wherein said selecting step further comprises selecting the sizes of the contiguous sections such that sections with relatively large fluctuations in brightness are smaller than sections with relatively small fluctuations in brightness.

10. The method as claimed in claim 7, wherein step (b) further comprises:

determining an array of support points for each contiguous section that references the position of its associated surface function to the three-dimensional space; and determining the spacing of the support points within each section in accordance with the fluctuations in brightness of the halftone picture within that section.

* * * * *

UNITED STATES PATENT AND TRADEMARK OFFICE
CERTIFICATE OF CORRECTION

PATENT NO. : 5,510,825
DATED : April 23, 1996
INVENTOR(S) : Stefan Brües

It is certified that error appears in the above-indentified patent and that said Letters Patent is hereby corrected as shown below:

Column 2, line 48, change "1.6" to -- 16 --; line 59, change "51.9" to -- 519 --.

Column 3, line 65, change "Hermits" to -- Hermite --.

Signed and Sealed this

Twenty-seventh Day of August, 1996

Attest:

BRUCE LEHMAN

Attesting Officer    Commissioner of Patents and Trademarks